(12) United States Patent
Meszaros et al.

(10) Patent No.: US 8,714,620 B1
(45) Date of Patent: May 6, 2014

(54) COWL TRIM WITH INTEGRATED FOOTREST

(71) Applicant: Ford Global Technologies, LLC, Dearborn, MI (US)

(72) Inventors: Edward Joseph Leonard Meszaros, Amhesrtburg (CA); Keith Brown, Riverview, MI (US); William Bauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/755,140

(22) Filed: Jan. 31, 2013

(51) Int. Cl.
*B60N 3/06* (2006.01)
(52) U.S. Cl.
USPC .......................................... 296/75; 296/39.1
(58) Field of Classification Search
USPC .................... 296/75, 97.23; D12/203; 74/564
See application file for complete search history.

(56) References Cited

U.S. PATENT DOCUMENTS

| 6,270,152 B1 * | 8/2001 | Sato | 296/203.02 |
| 6,634,694 B2 * | 10/2003 | Matsushita | 296/75 |
| 7,967,358 B2 * | 6/2011 | Shukuri et al. | 296/75 |

FOREIGN PATENT DOCUMENTS

EP 2085304 8/2009

* cited by examiner

*Primary Examiner* — Dennis H Pedder
(74) *Attorney, Agent, or Firm* — Vichit Chea; Price Heneveld LLP

(57) ABSTRACT

A cowl trim assembly includes a panel body having front and side panel portions with anchor mechanism adapted to couple the trim assembly to a vehicle frame, and more specifically, to a vehicle door sill frame. A footrest assembly extends outwardly from the panel body having one or more reinforcement members disposed on an underside of the footrest assembly which are adapted to support the footrest assembly on a vehicle floor. In this configuration the footrest assembly is an integrated part of the cowl trim assembly, thereby providing a one-piece trim component having a self supporting footrest assembly, wherein the reinforcement members are adapted to carry loads applied to the footrest assembly by a vehicle occupant to the vehicle frame.

10 Claims, 7 Drawing Sheets

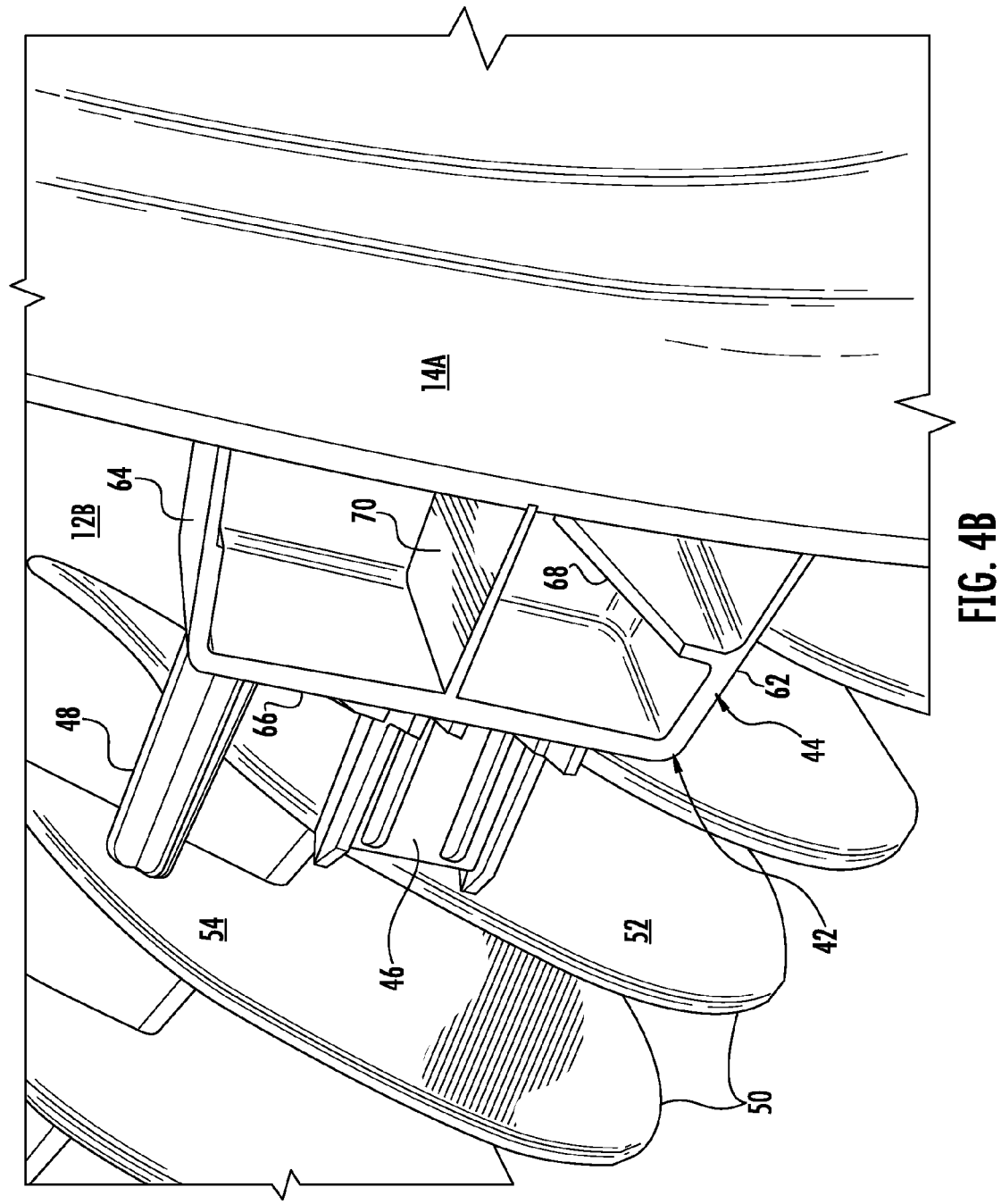

COWL TRIM WITH INTEGRATED FOOTREST

FIELD OF THE INVENTION

The present invention generally relates to a cowl trim piece for use in a vehicle interior, and more specifically, to a cowl trim piece having an integrated footrest which is adapted to provide footrest support to a vehicle occupant.

BACKGROUND OF THE INVENTION

Footrest assemblies are generally installed on a vehicle floorboard in a vehicle interior on the driver's side of the vehicle interior. These footrests are generally supported with welded studs, hat-shaped support brackets, foam blocks or other like support mechanisms which are rigidly secured to the floorboard and then covered with carpet to conceal the support system of the footrest. Often times, these footrest assemblies are standalone assemblies, much like a dead pedal design, which are used for increased rigidity in the footrest structure and at the same time generally increase the costs of the overall footrest assembly installation. When incorporating a footrest assembly into a vehicle design, changing the vehicle floor geometry to support a standalone footrest can be very difficult and costly on the manufacturing side. Thus, a need exists for a footrest assembly that can be added to a carryover vehicle without requiring expensive tooling and other cost implications tied to floorboard configurations and standard vehicle carpets.

The present invention provides a footrest assembly which can be easily installed on a carryover vehicle, thereby providing a single-part solution, wherein the footrest assembly is supported by a cowl trim assembly as coupled to a vehicle frame.

SUMMARY OF THE INVENTION

One aspect of the present invention includes a cowl trim assembly having front and side panel portions thereby defining a panel body. A footrest assembly extends outwardly from the side panel portion and includes one or more reinforcement members disposed on an underside of the footrest assembly. The one or more reinforcement members are adapted to support the footrest assembly on a vehicle floor, and more specifically, a vehicle floorboard. The reinforcement members are adapted to carry loads applied on the footrest assembly by a vehicle occupant to the vehicle frame.

Another aspect of the present invention includes a cowl trim assembly having a panel body with an integrated footrest assembly extending laterally from the panel body. One or more reinforcement members are disposed in a downwardly opening interior space of the footrest assembly and are adapted to support the footrest assembly on a vehicle floor. The reinforcement members are adapted to carry loads realized on a contact surface of the footrest assembly by a vehicle occupant to a vehicle frame.

Yet another aspect of the present invention includes a cowl trim assembly having a panel body including front panel and a side panel. A footrest assembly extends laterally from the side panel and includes one or more reinforcement members disposed on an underside of the footrest assembly. A load bearing path is formed between the footrest assembly and the reinforcement members, wherein the load bearing path is adapted to carry a load applied by a vehicle occupant from the footrest assembly to a vehicle frame.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4B is a fragmentary perspective view taken at location IVB of FIG. 4.

DETAILED DESCRIPTION OF THE PREFERRED EMBODIMENTS

Figure 1:
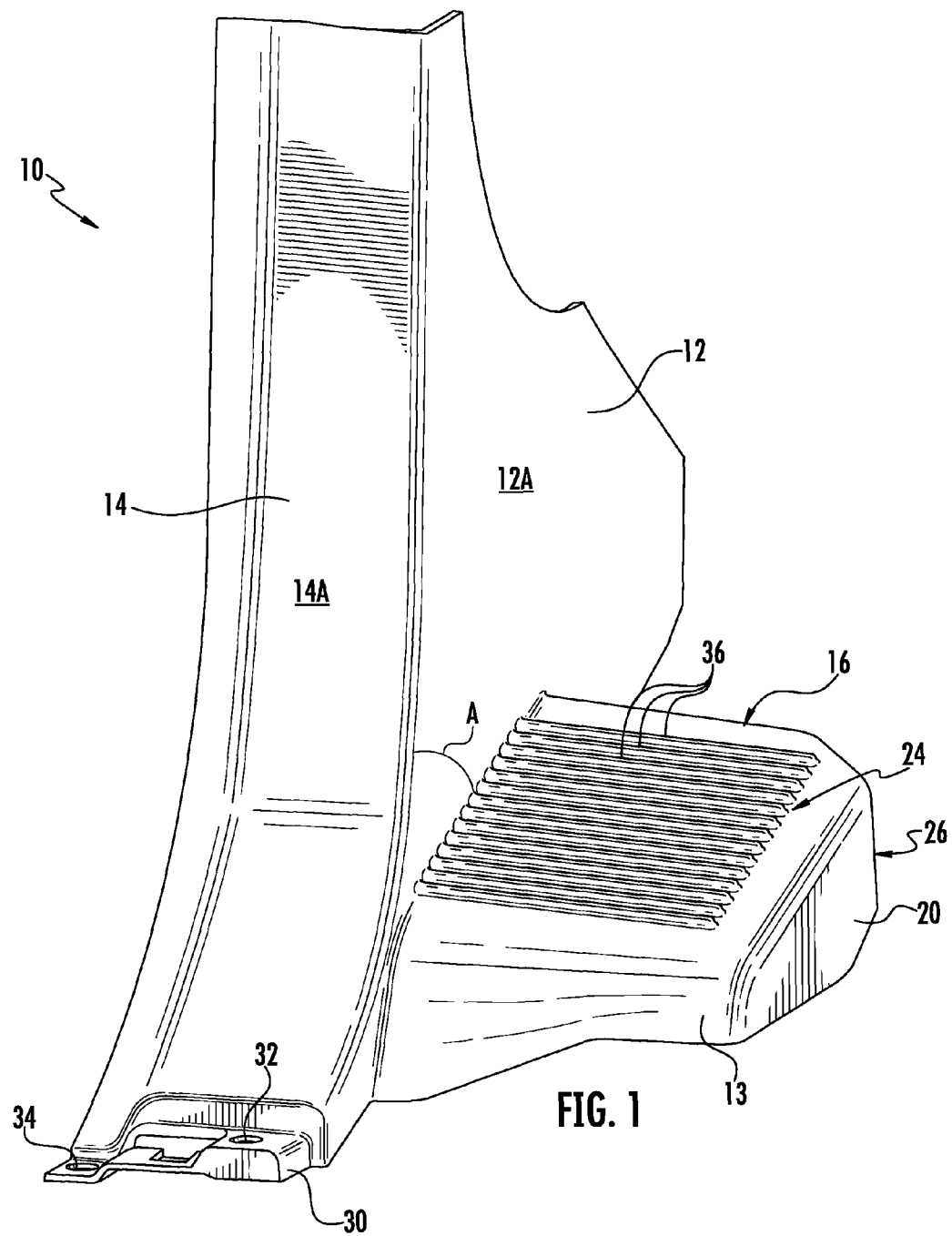
FIG. 1 is a perspective view of a cowl trim assembly according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
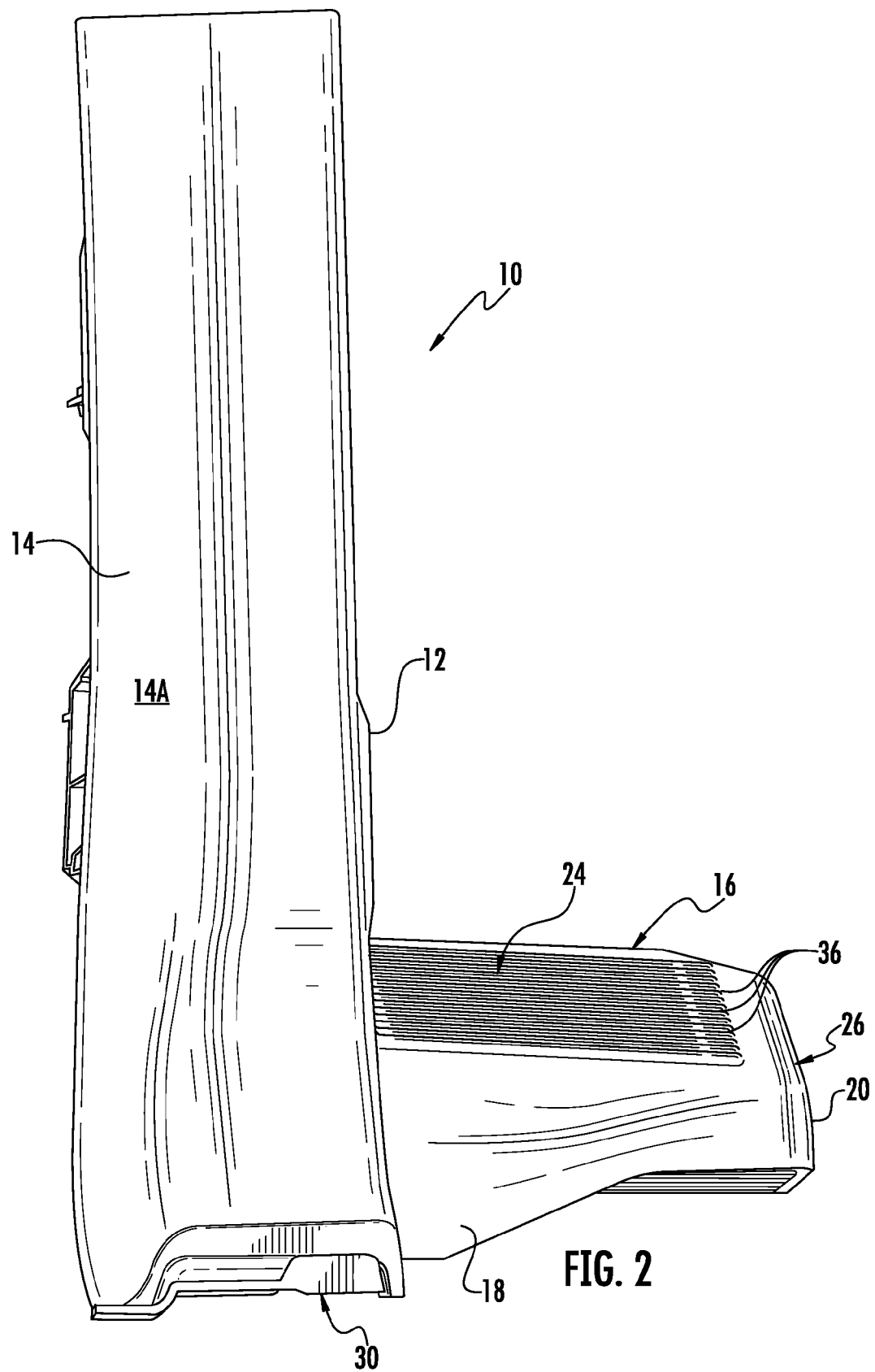
FIG. 2 is a front elevational view of the cowl trim assembly of FIG. 1.

Referring now to FIGS. 1 and 2, the reference numeral 10 generally designates a cowl trim assembly for use in a vehicle interior. Specifically, the cowl trim assembly 10 shown in FIGS. 1 and 2 is generally considered a left-hand trim piece disposed in a lower portion of a vehicle interior at or near a vehicle floorboard on a driver's side as best shown in the environmental view of FIG. 5. As shown in FIG. 1, the cowl trim assembly 10 includes a panel body having a side panel 12 with an exterior facing side 12A and a front panel 14 with an exterior facing side 14A. As shown in FIG. 1, the side panel 12 and the front panel 14 are generally orthogonal or perpendicular to one another such that the exterior side 14A of the front panel 14 will generally face a vehicle occupant, or driver, when a vehicle door is in an open position, and will generally be concealed, when the vehicle door is closed. As such, the front panel 14 is generally disposed and operably connected to sheet metal parts of a vehicle frame as disposed about a door sill of the vehicle. The exterior side 12A of side panel 12 generally faces inwardly into the vehicle interior near a driver's side floorboard.

As further shown in FIGS. 1 and 2, a footrest assembly 16 extends orthogonally or laterally from a lower portion of the side panel 12, thereby defining a footrest for use by the vehicle occupant. The footrest assembly 16 includes a front wall 18, side wall 20 and a rear wall 22 (FIG. 3) and an upper contact surface 24, thereby defining a body 26 of the footrest 16. The body portion 26 of the footrest 16 is a generally downwardly opening structure which defines a cavity portion having reinforcement members which are further described below.

Figure 5:
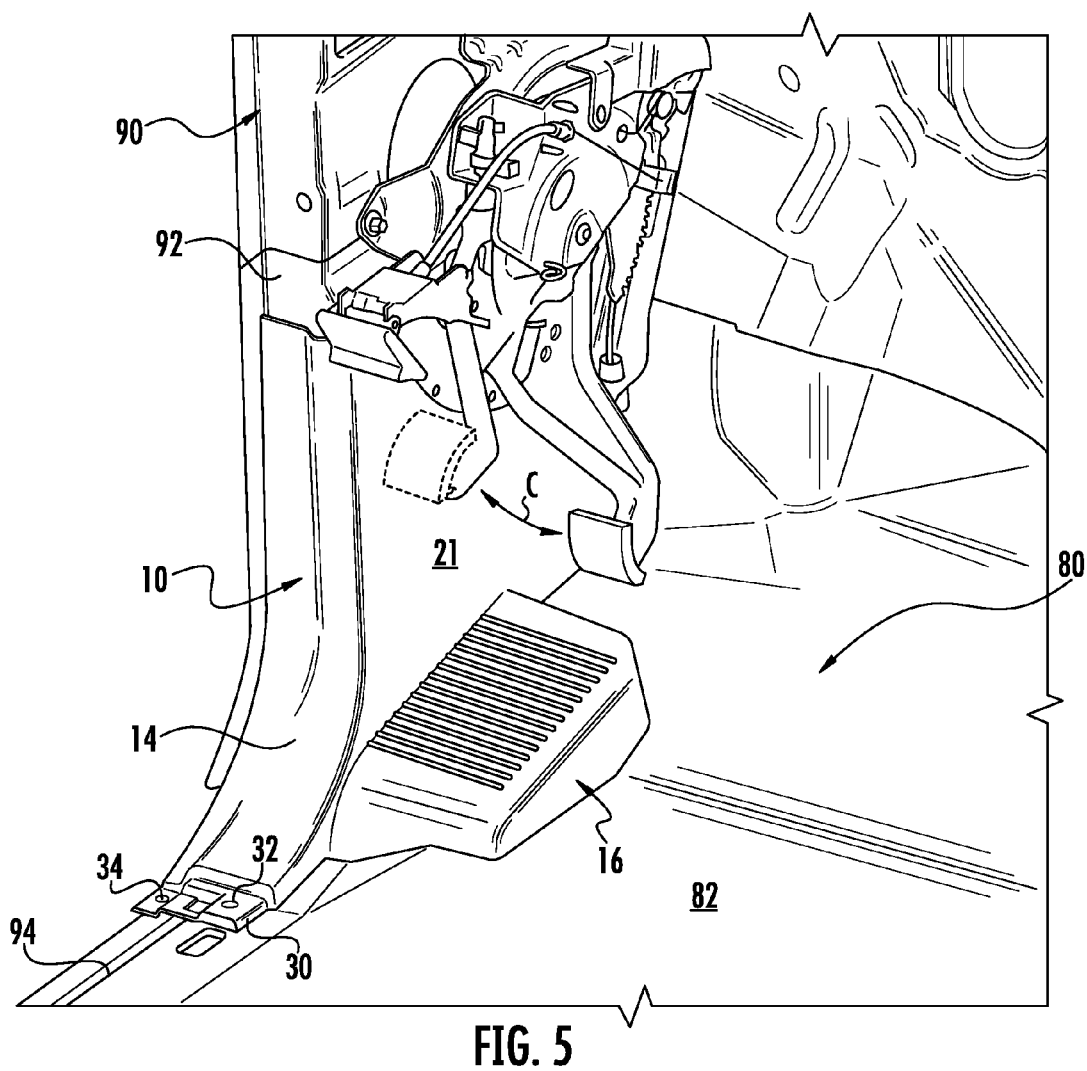
FIG. 5 is an environmental view of the cowl trim assembly of FIG. 1 as installed in a vehicle interior.

As shown in FIG. 1, the front panel 14 is a slopped panel which is adapted to cover the intersection of an upright portion of a door sill and the floor or rocker panel of the door sill as best shown in FIG. 5. At a lowermost and front most portion of the front panel 14, a tab 30 is disposed having one or more connection apertures 32, 34 which are adapted to couple the cowl trim assembly 10 to a rocker panel assembly using features such as screws or clips. As shown in FIG. 1, the tab member 30 is generally a underlay-type tab member which, in assembly, would generally be covered by a scuff plate trim piece to conceal the connection of the cowl trim piece 10 to the rocker plate of the vehicle frame. As shown in FIGS. 1 and 2, the tab portion 30 of the cowl trim assembly 10 has a generally stepped configuration such that attachment aperture 34 is disposed on a lower level than attachment aperture 32. The stepped configuration of the tab portion 30 allows for the tab portion 30 to closely follow the contours of the rocker plate of the vehicle frame for securely coupling the cowl trim assembly 10 thereto.

As further shown in FIG. 1, the upper contact surface 24 of the footrest assembly 16 includes a plurality of traction contours 36 which are adapted to provide grip to the vehicle occupant's foot as placed on the footrest assembly 16. Further, it is contemplated that the contoured traction members 36 may be disposed on a removable liner, similar to a liner found on the bottom of a cup holder, such that the liner could be easily removed for cleaning and could also be a customized liner that has a consistent appearance with the top side of the vehicle pedals, thereby providing a consistent and unitary appearance of the footrest assembly 16 as viewed in the vehicle interior near the vehicle pedals.

Figure 3:
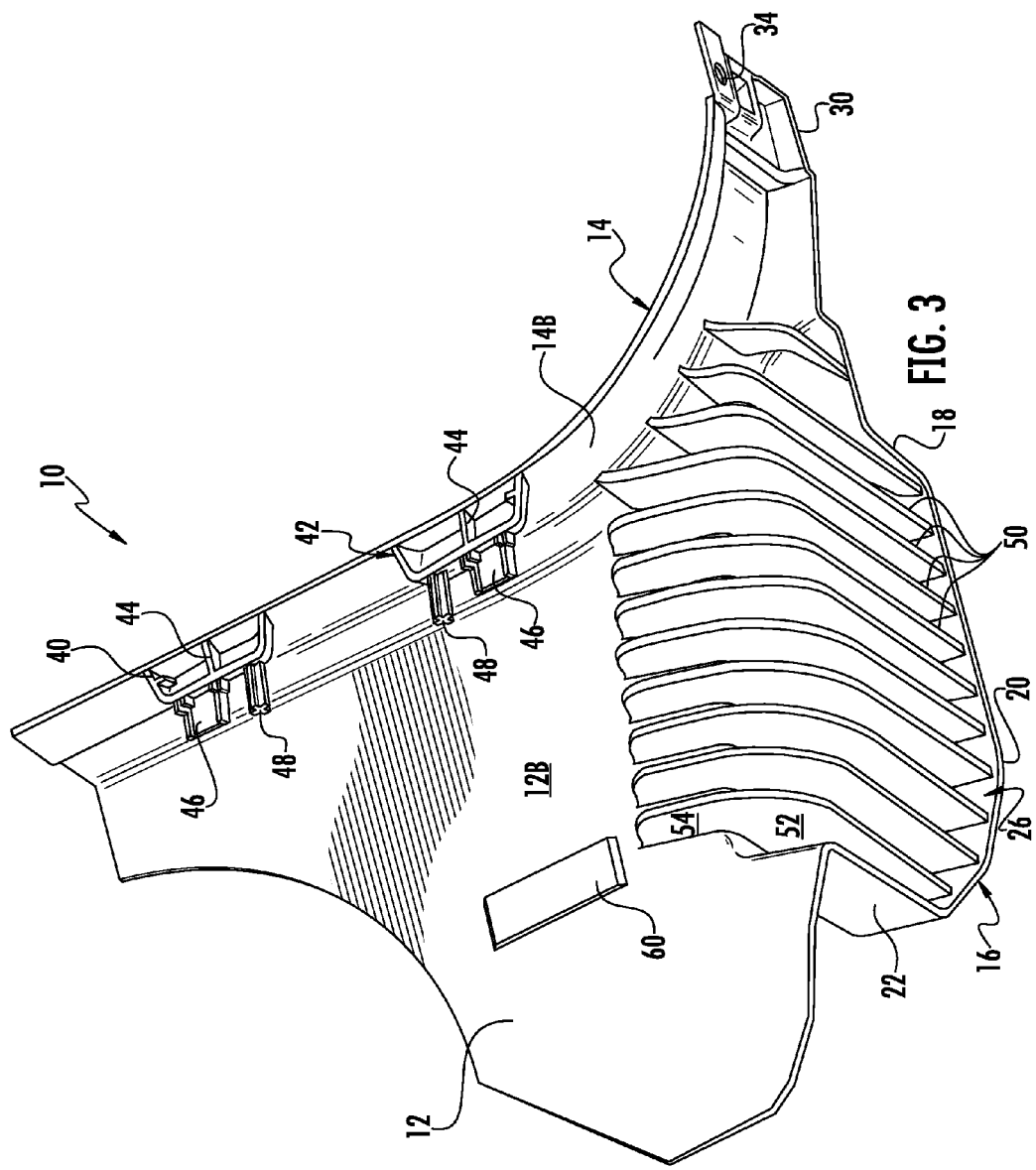
FIG. 3 is a side perspective view of the cowl trim assembly of FIG. 1.
Figure 4:
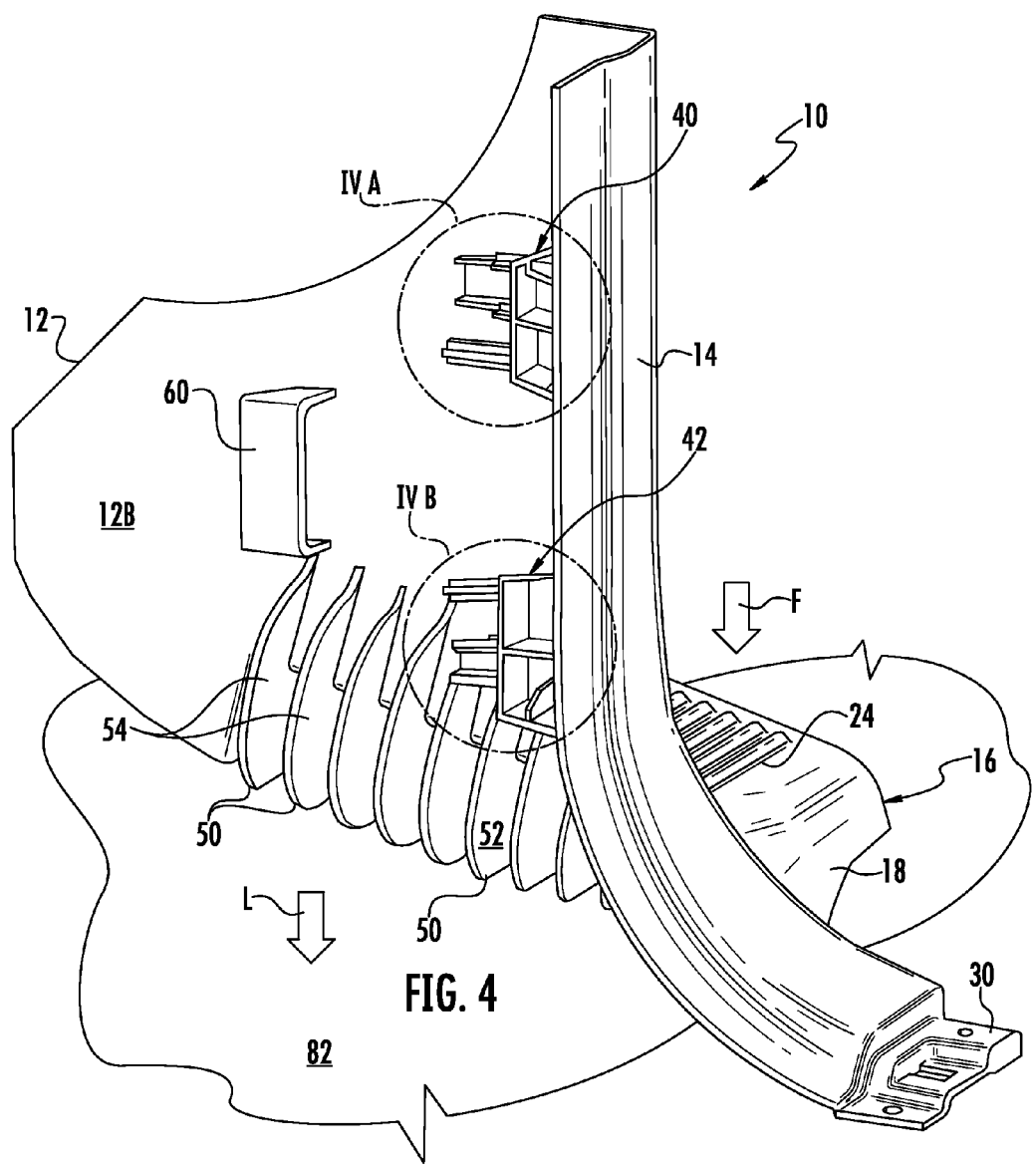
FIG. 4 is a front perspective view of the cowl trim assembly of FIG. 1 as supported on a vehicle floorboard.

Referring now to FIGS. 3 and 4, the cowl trim assembly 10 is shown from a generally interior side, such that interior portions 12B, 14B are visible of the side panel 12 and front panel 14 that make up the panel body. Disposed on the interior side 14B of front panel 14, anchor mechanism 40, 42 are shown with anchor mechanism 40 being disposed generally above anchor mechanism 42. Each anchor mechanism includes a base portion 44 having a clip portion 46 and a guide member 48 disposed thereon. In assembly, the clip portions 46 are adapted to clip the anchor mechanism 40, 42 to a vehicle frame member while the guide members 48 are adapted to ensure that the anchor mechanisms 40, 42 are properly aligned with the vehicle frame such that the cowl trim assembly 10 can be easily and properly installed. As shown in FIG. 3, the clip mechanism 46 of anchor mechanism 40 is disposed above the guide member 48 in assembly. Conversely, the clip member 46 of anchor mechanism 42 is disposed below guide member 48 in assembly. The diversified configurations of the anchor mechanisms 40, 42 provide for a more rigid engagement of the cowl trim assembly 10 with the vehicle frame and thereby provide for better dispersion of forces realized on the cowl trim assembly 10 into the vehicle frame.

As shown in FIGS. 3 and 4, the footrest assembly 16 includes a plurality of reinforcement members 50 which generally fill the interior space defined by the body portion 26 of the footrest assembly 16. As shown in the embodiment of FIG. 3, the reinforcement members 50 are generally L-shaped members having a first portion 52 and a tab portion 54, wherein the first portion 52 is substantially disposed below the upper contact surface 24 (FIGS. 1 and 2) of the footrest assembly and are adapted to contact the vehicle floor in assembly. In this way, the first portion 52 of the reinforcement members 50 is adapted to support the footrest assembly 16 on a vehicle floor and carry loads or forces realized on the footrest assembly 16 from a vehicle occupant to the vehicle floor. The cowl trim assembly 10 is designed to provide a fully supported footrest assembly 16 that can carry force loads from the contact surface 24 to the vehicle floorboard through standard carpet and insulation assemblies to the vehicle frame. Tab portions 54 of the reinforcement members 50 generally curve from underneath the footrest assembly 16 to connecting surfaces disposed on the interior sides 12B, 14B of the side and front panels 12, 14. As best shown in FIG. 4, a load path, generally indicated by arrow L, is created within the cowl trim piece 10 as a force, indicated by arrow F, is realized on the contact surface 24 of the footrest assembly 16. As specifically shown in FIG. 4, the force F is indicated in a downward direction on the contact surface 24 of the footrest assembly 16. Further, it is contemplated that the force can be an angled force that is comparable to the angle of the contact surface 24 of the footrest assembly 16, which is demonstrated by angle A, as shown in FIG. 1. Once the force F is realized on the footrest assembly 16 by a vehicle occupant's foot, a load path L formed within the cowl trim assembly 10 is adapted to carry the load from the footrest assembly 16 to the reinforcement members 50. As noted above, the reinforcement members 50 are disposed on and supported by the vehicle floorboard, such that the load L is transferred from the first portion of the reinforcement members 50 to the vehicle frame. In this way, the cowl trim assembly 10 of the present invention provides for a one-piece fully integrated trim assembly that provides adequate support for a footrest assembly disposed within a vehicle interior.

Further, as shown in FIGS. 3 and 4, the anchor mechanisms 40, 42 are generally disposed approximate to and above the footrest assembly 16 and are thereby properly positioned to keep the cowl trim assembly 10 in place as loads are realized on the footrest assembly 16 from the vehicle occupant. As further shown in FIGS. 3 and 4, an engagement feature 60 is disposed on the interior side 12B of the side panel 12 which is generally adapted to engage a member of the vehicle frame thereby ensuring that the side panel 12 of the cowl trim assembly 10 stays securely connected to the vehicle frame and does not separate and interfere with the pedal operation by the vehicle occupant.

Generally, a footrest assembly must be supported by a structural feature operably coupled to a vehicle floorboard. As noted above, these structural supports are specifically configured and generally disposed underneath a carpet feature, such that if a footrest is desired within a vehicle interior, it must be incorporated into the manufacturing process of the vehicle at the manufacturing plant. The present invention allows for a footrest assembly to be installed in a vehicle without having to change the floorboard configuration, carpet and insulation or add structural reinforcing elements to the floorboards of the vehicle interior by providing a one-part solution which is adapted to receive and carry the load realized on the footrest through reinforcement members disposed under the footrest assembly on the cowl trim. As such, the cowl trim assembly 10 of the present invention allows for a footrest option to be added to a vehicle as an aftermarket option or during the manufacturing process. Adding structural elements to a floorboard of a vehicle interior and putting carpeting over such structural elements are specific manufacturing sequences that are generally carried out in the manufacturing process in a specific order. As such, adding a standalone footrest assembly requires manipulation of this precise sequence which generally translates to increased costs of manufacture. However, with the present invention, a desired footrest assembly can be installed within the vehicle interior without the need for floorboard reconfiguration, structural elements disposed on the floorboard, or separate carpet considerations, such as vinyl pads indicating the location of a footrest, such that the cowl trim and integrated footrest assembly of the present invention provides for a economic solution for a footrest option. The cowl trim assembly 10 of the present invention is adapted to be installed in a similar manner as a cowl trim assembly that does not include an integrated footrest, such that manufacturing procedures that take place prior to a cowl trim installation do not need to be modified when using the present invention.

Figure 4A:
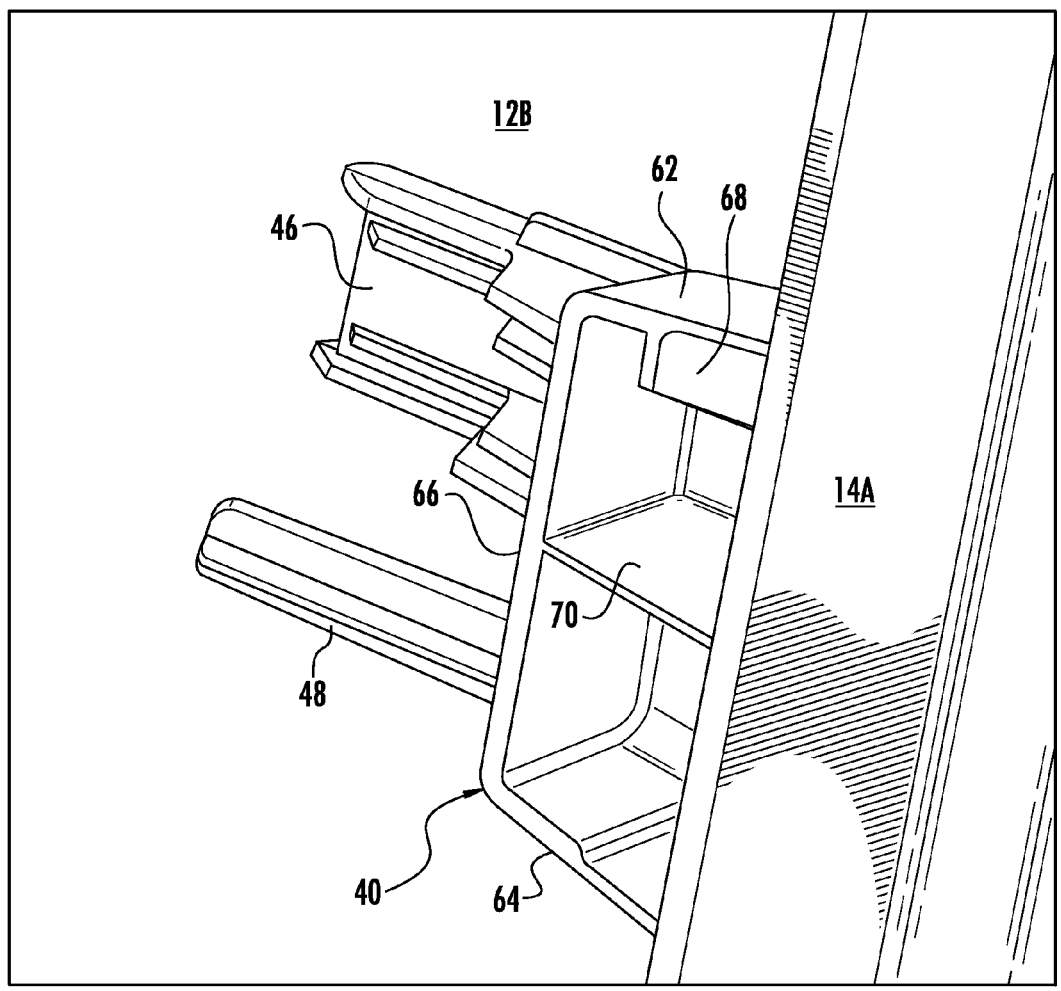
FIG. 4A is a fragmentary perspective view taken at location IVA of FIG. 4.

Referring now to FIGS. 4A and 4B, the anchor mechanisms 40, 42 are better shown and further described herein. Each anchor mechanism 40, 42 includes a base portion 44 having generally tapered side walls 62, 64 and a top wall 66 which generally define the base portion 44. Internally, reinforcement members 68, 70 are disposed to rigidify the structure of the base portion 44 which, along with filleted edges disposed throughout the base portion 44, provides for a secure base for attaching the cowl trim piece 10 to a vehicle frame. The tapered side walls 62, 64 of the base portion 44 provide for a wedging engagement of the base portion 44 with the vehicle frame, such that better surface contact is made with the vehicle frame for facilitating the dispersion of forces from the cowl trim 10 to the vehicle frame. The clip member and guide member 46, 48 extend laterally from the top surface 66 of the base portion 44 and are used to guide the anchor mechanisms 40, 42 to a secure engagement with the vehicle frame. As shown in FIGS. 4A and 4B, the guide member 48 is in the configuration of a cross-sectional peg member which is generally adapted to engage a guide aperture disposed on the vehicle frame. In this way, the guide member 48 insures that the clip member 46 will be guided to the proper location for engagement with a reciprocal clip member disposed on the vehicle frame. As noted above, the anchor mechanisms 40, 42 have reciprocal configurations, such that the guide members 48 and the clip members 46 are inversely related when comparing anchor mechanisms 40, 42. This inverse configuration provides for a more structurally sound engagement of the cowl trim assembly 10 with the vehicle frame.

Referring now to FIG. 5, the cowl trim assembly 10 is shown in an environmental view within a vehicle interior 80. The cowl trim assembly 10 is disposed on the vehicle frame 90 which is generally comprised of a sheet metal part which provides for a structurally sound and rigid part for the cowl trim assembly 10 to couple thereto. The front panel 14 of the cowl trim assembly 10 is shown coupled to an upright portion 92 of a door sill frame, such that in this configuration, the anchor mechanisms 40, 42 are disposed in and coupled to engagement features disposed on the upright 92. As further shown in FIG. 5, the footrest assembly 16 is disposed approximate to and below the area of the front panel 14 where the anchor mechanisms 40, 42 engage with the upright 92. Further, the tab portion 30 of the front wall 14 has attachment apertures 32, 34 which are configured in a stepped pattern to match the vehicle frame portion 94 which, is generally considered a rocker plate frame component. As noted above, the rocker plate will further be covered by a scuff plate trim member which is adapted to cover the underlay tab portion 30 of the cowl trim assembly 10. In this way, the tab portion 30 provides another attachment location for the cowl trim assembly 10 to ensure secure engagement of the cowl trim assembly to the vehicle frame.

As further shown in FIG. 5, the cowl trim assembly 10 is designed with the footrest assembly 16 in such a position that the footrest assembly 16 does not interfere with the travel of a parking brake pedal shown in FIG. 5, which travels along a path as indicated by arrow C. Further, as shown in FIG. 5, the footrest assembly 16 is disposed on and supported by the vehicle floor 82 such that the reinforcement ribs 50 disposed on an underside of the footrest assembly 16 are in contact with the vehicle floor 82 to transfer loads from the footrest assembly 16 to the vehicle floor 82. Referring again to FIG. 3, the reinforcement ribs 50 are generally parallel spaced apart reinforcement ribs that substantially occupy the interior portion of the body 26 of the footrest assembly 16. Thus, the reinforcement ribs 50 provide for a solidly reinforced footrest assembly 16 that carries loads from the footrest assembly 16 to the secure floorboard 82.

Thus, the footrest assembly 16 disposed on the cowl trim piece 10 of the present invention saves time in assembly as compared to a standalone footrest while not affecting the manufacturing sequence prior to the cowl trim installation. The cowl trim assembly 10 further provides for a package efficiency realized within the vehicle architecture, as there is no need for additional anchoring or attachment features in order to have a properly supported footrest assembly as compared with other standalone footrest assemblies which are rigidly coupled to the vehicle floorboard or supports located on the vehicle floorboard.

Further, it is contemplated that the cowl trim assembly 10 of the present invention can have several different variants which provide for unique footrest options thereby providing vehicle owners with options for their footrest assembly according to specific vehicle trim levels. For example, a sport trim variant could allow for a more aggressive footrest position and angle, such as angle A shown in FIG. 1, where the contact surface 24 would have a greater incline disposed thereon, such that the angle A between the contact surface 24 and the front panel 14 would be less of an angle providing for a more aggressive footrest assembly 16. Such a sport trim variant could be even more aggressive where a brake pedal is not included for the park brake, when the vehicle contains a different park brake option, such as an electric park brake assembly. When this is the case, the footrest assembly 16 does not need to be specifically configured to allow for travel of the park brake and a more substantial footrest assembly can be integrated into the cowl trim assembly. In different high trim levels, metallic trim features could be added to the cowl trim assembly without affecting the operation and anchoring of the cowl trim assembly to the vehicle frame for providing an adequately footrest assembly. Further, when a manual transmission is in use in a vehicle, the cowl trim assembly 10 could offer different footrest positions to optimize clutch operation, such as variations in angles and variations in the overall length of the contact surface of the footrest assembly as compared to footrest assemblies used for a vehicle having an automatic transmission.

As a standalone piece the cowl trim piece assembly 10 of the present invention, that is a fully integrated piece generally comprised of a polymeric material, provides for a low-cost solution for offering a footrest option to a consumer in a vehicle interior. With the cowl trim piece being installed in a vehicle interior essentially the same way that a cowl trim piece is installed in a vehicle interior without a footrest assembly, the present invention allows for a footrest option without having to modify the manufacturing steps that take place prior to the cowl trim installation. Manipulation of the manufacturing steps proceeding the cowl trim attachment or installation is an extremely costly manufacturing concern, which the present invention avoids by being easily installed over the carpet of a finished floorboard according to standard specifications. Further, the footrest assembly of the present invention does not require structural supports from the vehicle floorboard and therefore is easily installed in a vehicle interior.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A cowl trim assembly, comprising:
   front and side panel portions adapted to be coupled to a vehicle frame;
   a footrest assembly extending outwardly from the side panel portion;
   one or more reinforcement members disposed on an underside of the footrest assembly and adapted to support the footrest assembly on a vehicle floor, the reinforcement members further adapted to carry loads applied on the footrest assembly by a vehicle occupant to the vehicle frame;
   a plurality of anchor mechanisms disposed on the front panel portion, the anchor mechanisms adapted to couple the cowl trim assembly to the vehicle frame, wherein the plurality of anchor mechanisms includes first and second anchor mechanisms disposed generally above the footrest assembly on an interior side of the front panel; and further wherein each of the first and second anchor mechanisms further includes a guide member and a clip member adapted to couple the cowl trim assembly to the vehicle frame.

2. The cowl trim assembly of claim 1, including:
   a contact surface disposed on an upper side of the footrest assembly, the contact surface adapted to receive the load as applied by the vehicle occupant.

3. The cowl trim assembly of claim 1, wherein:
   the one or more reinforcement members include a plurality of reinforcement ribs disposed in a generally parallel spaced apart relationship.

4. The cowl trim assembly of claim 3, wherein:
   the one or more reinforcement members include a tab portion coupling the reinforcement ribs to one of the side panel, the front panel, and combinations thereof.

5. The cowl trim assembly of claim 1, wherein:
   the cowl trim assembly is an integrated one-piece trim component.

6. A cowl trim assembly, comprising:
   a panel body;
   an integrated footrest assembly extending laterally from the panel body;
   one or more reinforcement members disposed in a downwardly opening interior space of the footrest assembly and adapted to support the footrest assembly on a vehicle floor; and
   wherein the reinforcement members are adapted to carry loads realized on a contact surface of the footrest assembly by a vehicle occupant to a vehicle frame;
   a plurality of anchor mechanisms adapted to couple the cowl trim assembly to the vehicle frame, the anchor mechanisms defining attachment locations for the cowl trim assembly, wherein the plurality of anchor mechanisms includes first and second anchor mechanisms disposed generally adjacent to and above the footrest assembly on an interior side of the panel body; and further wherein each of the first and second anchor mechanisms further includes a guide member and a clip member adapted to couple the cowl trim assembly to the vehicle frame.

7. The cowl trim assembly of claim 6, wherein:
   the downwardly opening interior space of the footrest assembly comprises:
   a front wall, a rear wall, and a side wall and the contact surface.

8. The cowl trim assembly of claim 6, wherein:
   the panel body includes a side panel portion and a front panel portion.

9. The cowl trim assembly of claim 8, wherein:
   the contact surface of the footrest assembly is disposed at a predetermined angle relative to the vehicle floor.

10. A cowl trim assembly, comprising:
    a panel body including a front panel and a side panel;
    a footrest assembly extending laterally from the side panel;
    one or more reinforcement members disposed on an underside of the footrest assembly;
    a load bearing path formed between the footrest assembly and the reinforcement members adapted to carry a load applied by a vehicle occupant from the footrest assembly to a vehicle frame;
    one or more anchor mechanisms disposed on the panel body, the anchor mechanisms adapted to couple the cowl trim assembly to the vehicle frame, wherein the one or more anchor mechanisms includes first and second anchor mechanisms disposed generally above the footrest assembly on an interior side of the front panel; and further wherein the cowl trim assembly is an integrated one-piece trim component.

* * * * *